UNITED STATES PATENT OFFICE.

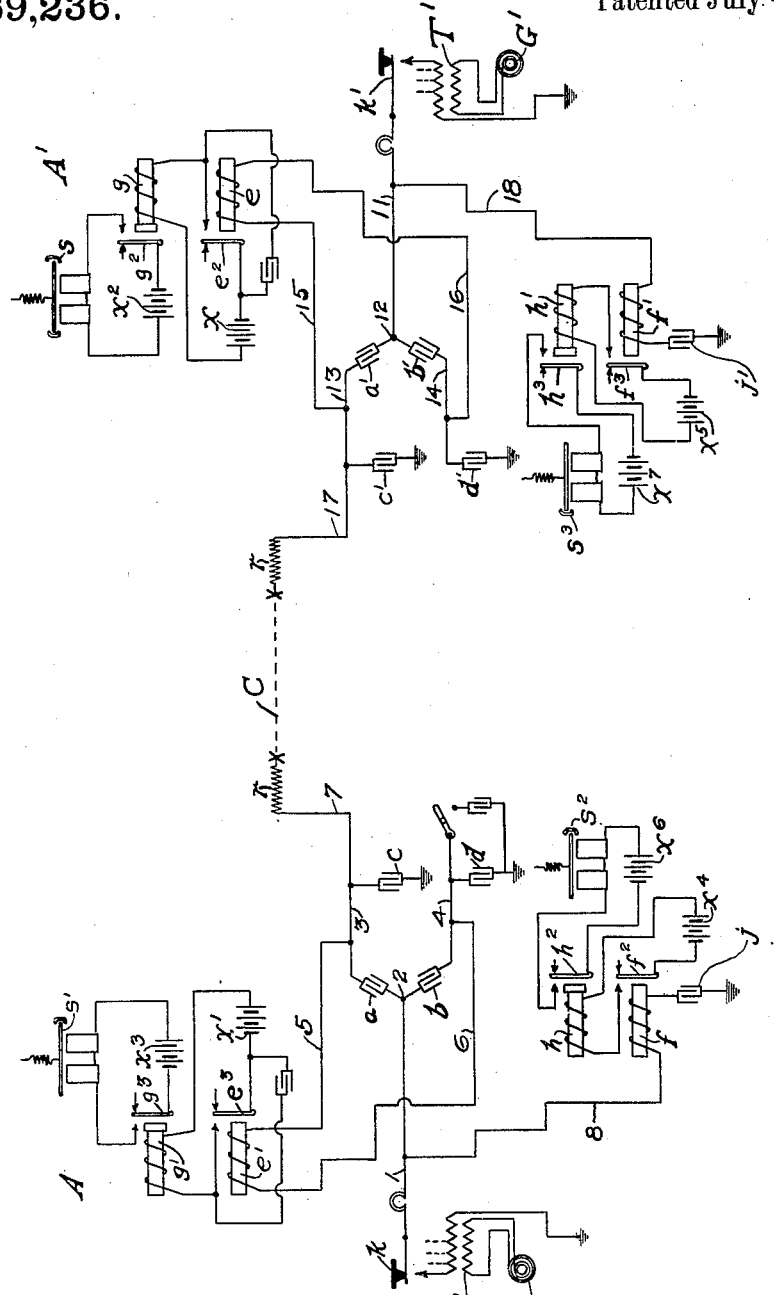

WILLIAM M. BRUCE, JR., OF SPRINGFIELD, OHIO, ASSIGNOR TO THE UNITED TELEGRAPH & CABLE COMPANY, OF SPRINGFIELD, OHIO, A CORPORATION OF OHIO.

DUPLEX TELEGRAPH SYSTEM.

1,189,236.      Specification of Letters Patent.      Patented July 4, 1916.

Application filed November 7, 1913. Serial No. 799,811.

*To all whom it may concern:*

Be it known that I, WILLIAM M. BRUCE, Jr., a citizen of the United States, residing at Springfield, in the county of Clark and State of Ohio, have invented certain new and useful Improvements in Duplex Telegraph Systems, of which the following is a specification.

My invention relates to improvements in duplex telegraph systems and the object of the invention is to provide a system of duplex telegraphy for use with alternating current, the same, however, being, with slight modification, capable of use with direct current. In this system, as applied to alternating currents I make use of the quick and slow relays in connection with a translating instrument such as a sounder or other device as set forth in my Letters Patent No. 1,072,886. The quick relay being adapted to respond to both the alternations of current and to the make-and-break current impulses produced by the ordinary sending key, while the slow relay responds only to the latter to operate the sounder or other instrument. In the system of duplex telegraphy which I have herein shown I employ at each station a substantially balanced bridge, including multiple condensers in circuit with the secondary winding of a transformer. The other or primary winding of the transformer being connected to the poles of an ordinary alternating current generator. From each side of this bridge and between the condensers I extend a circuit which includes the quick relay which controls a local circuit for the slow relay and one side of this substantially balanced bridge I connect by a conductor to the same side of a similar bridge at another station. For the convenience of the sending operator I also preferably provide a branch from the transmitting key to ground through a quick relay and condenser which through the usual slow relay controls a sounder or other device which responds to the sending impulse.

The relay which controls the receiving sounder being bridged across the branches of the main circuit will not receive current impulses from this circuit but inasmuch as the main conductor or cable, which connects the stations, is connected to one branch only of this line or bridge, the receiving relay at the opposite station will receive these current impulses, so that the manipulations of the key at one station will operate the sounder at the other station and vice versa.

In the accompanying drawing I have shown a diagram of my improved system in which A and A′ represent two sending and receiving stations connected together by a conductor or cable C, which by reason of the fact that the system is operated by alternating current may be of great length and capacity and of high resistance.

G and G′ represent generators and T and T′ transformers. At station A, the circuit for the secondary of the transformer T extends from ground at one end to an ordinary telegraph key $k$ and thence by conductor 1 to the point 2 where it branches through condensers $a$ and $b$, conductors 3 and 4 and condensers $c$ and $d$ to ground. The condensers $c$ and $d$ are preferably of low capacity, those of $a$ and $b$ being preferably of higher capacity, condensers $c$ and $d$ being substantially of the same capacity and $a$ and $b$ being of substantially equal capacity. The circuit branches being thus substantially balanced when the key $d$ is depressed current will flow equally from the generator and transformer through the said branches, including conductors and condensers. In a "bridge" across these branches (from conductors 3 and 4) is connected a quick relay $e'$ by conductors 5 and 6, which tap the conductors 3 and 4 between the condensers $a$—$b$ and $c$—$d$ and inasmuch as these branches are balanced there will be no difference in potential between the points 3 and 4 consequently there will be no current flow through the relay $e'$. The line or cable conductor added at 3 of course tends to unbalance these conditions but owing to the fact that this system can be worked through very high resistances—whatever unbalanced condition is caused by current flowing through the high resistance in the cable or conductor can in nearly all cases be compensated for by adjustment of the relay $e'$ without changing the condensers in the "bridge". One side of this bridge, say from the branch 3 is connected by conductor 7 to the cable or main conductor which leads to the other station. This station is similarly equipped, that is, the secondary winding of the transformer T′ extends from ground to the contact of the key $k'$ thence by conductor 11 to the point 12 where it branches through condensers $a'$ and $b'$ and conductors 13 and 14 to condensers $c'$ and $d'$ to ground.

The relay $e$ is bridged across the branches by the conductors 15 and 16 and the branch conductor 13 is connected to the cable or main conductor C by conductor 17. Upon closing the key $k'$ a circuit will be made from the secondary winding of the transformer T' through the two branches 14 and 13 containing the condensers $a'$, $b'$ and $c'$, $d'$ which being substantially balanced will permit no current to flow through the relay $e$. Assuming the key $k$, however, to be closed a circuit will be established from thence through conductor 1, which branches at 2, one branch passing through condenser $a$, conductors 3 and 7, cable C, conductors 17 and 15, relay $e$, conductor 16, condenser $d'$ to ground. This path including as it does only the condensers $d'$ at station A' instead of the three conductors $a'$, $b'$ and $d'$ will cause the current which passes through the cable C to operate the relay $e$. Similarly if the key $k'$ is depressed the circuit from the grounded transformer will pass through conductor 11, condenser $a'$, conductors 13 and 17, cable C, conductor 5, relay $e'$, conductors 6 and 4, and condenser $d$ to ground: Condensers $a$ and $b$ offering resistance which will cause sufficient current to pass through the relay $e'$ to operate the same.

Each of the relays $e$ and $e'$ are delicate relays and respond to the alternations of the current as well as to any interruptions therein. Each of these relays control a local circuit including a slow relay $g$ (or $g'$) and this slow relay is so constructed that it will be held energized by the rapid vibration of the delicate relay, in response to alternations but will be deënergized by any break in the circuit caused by the operations of the key and this in turn will operate the sounder in the usual way through a local circuit as described in the patent heretofore referred to. Assuming the impulses to come from the key $k$ the relay $e$ will, when the key is depressed, vibrate from the alternations through the transformer and cause the armature $e^2$ to vibrate between its contacts, closing the local battery circuit through slow relay $g$, thus energizing said relay and holding it energized as long as the alternations continue uninterrupted. If the key is opened the break in the circuit will be sufficient to allow the armature to drop back. As the key is manipulated in the ordinary way these interruptions will be transmitted by the relay $g$ to the sounder $s$ in the usual way from the battery $x^2$. When the key $k'$ is operated relay $e'$ will be energized and deënergized by the alternations of the current and its armature spring $e^3$ vibrating will cause the relay $g'$ to energize and remain energized so long as the rapid vibrations continue. If the current is broken at the key $k'$, however, the relay $g'$ will be deënergized and the operation of its armature spring $g^3$ will make and break the local circuit from battery through sounder $s'$ in response to the long or short impulses sent from the key $k'$ in the ordinary operation of telegraphing.

For convenience to the sending operator I provide at each station what might be termed a sending sounder so that the sending operator may hear what he himself is sending. This is shown at station A in which a branch conductor 8 leads from the conductor 1 and extends through a quick relay $f$ and condenser $j$ of low capacity to ground. This quick relay through its armature spring $f^2$ controls a local battery circuit from battery $x^4$ through slow relay $h$, which slow relay through its armature spring $h^2$ controls a local circuit through battery $x^6$ and sounder $s^2$, the same arrangement is shown at station A' where conductor 18 leading from the conductor 11 extends through the quick relay $f'$, low capacity condenser $j'$ to ground. Armature spring $f^3$ of the quick relay controls the circuit of the slow relay $h'$ from battery $x^5$ and the slow relay in turn controls the circuit from battery $x^7$ to sounder $s^3$.

While the condensers $a'$ and $b'$ will ordinarily be of the same capacity I have found that a variation in the capacity of the condensers $a$ and $a'$ may be compensated for in the adjustment of the relays $e$ and $e'$ so that it is not essential that these condensers $a$ and $a'$ be exactly the same as $b$ and $b'$. I have used this circuit successfully with condensers $b$ and $b'$ each of two microfarads, while the condensers $a$ and $a'$ were each of four microfarads. I have found that it is also desirable to have means for adjusting the capacity of the condensers $d$ and $d'$ in order to compensate for any unbalanced condition of the circuit by means of leakage on the main line. This can be done by using larger or smaller condensers or a plurality with means for cutting them in or out. I have also found it desirable in some cases to use resistance at the ends of the cable C in the conductors 7 and 17 as indicated at $r$ in order to cut down the amount of current that passes through the cable so that leakage in the cable or conductor would not sufficiently disturb the balance of the circuit to cause the relay $e'$ to operate from the transmitter in the same station.

I have shown in the receiving circuits condensers placed in a shunt across the local circuit for the slow relays to take the discharge and prevent sparking at the relay contacts. These, of course, may be dispensed with if desired. I have used this circuit with a sixteen cycle generator and a heavy transformer one to one with maximum impedance and a voltage at the transformer of 80 volts, through resistance up to 50,000 ohms. By increasing the voltage at the transformer to 220 volts I have operated this system through 200,000 ohms. In the latter case the condensers $b$ and $b'$ were increased to three microfarads. In these tests I used the relays $e$ and $e'$ of 2000 ohms and the condensers $c$, $c'$, $d$ and $d'$ of one micro-farad and those $j$ and $j'$ of one half micro-farad each.

By increasing the frequency of the alternations and winding the quick relays correspondingly the circuit may be quadruplexed and I have found that relays of 2000 ohms will respond to frequencies of approximately forty cycles. These figures, however, are only typical, as it is obvious, that they may be modified as desired to suit different conditions.

Having thus described my invention, I claim:

1. In a telegraph system, two stations each having a source of alternating current, a branched circuit for said current at each of said stations, each branch having multiple condensers, and a bridge connected between said multiple condensers and a conductor from one branch only of each of said circuits to the other circuit, and means for interrupting the current supply over said conductor to cause the relay in the bridge at the other station to operate, and a grounded branch from said main circuit including a relay which will operate in response to said impulses in the same station as and for the purpose specified.

2. In a telegraph system, adapted for alternating circuits, a source of current supply, a circuit therefor including a key or circuit breaker, a branch from said circuit including a quick relay, and a condenser to ground, another branch from said circuit including a condenser and conductor to one side of a branched circuit including multiple condensers and a bridge connected to the opposite sides of said branch circuit between said multiple condensers and including a quick relay, each of said relays being adapted to respond to the alternations of said current as well as interruptions therein and means controlled by said relays to cause the interruptions to be recorded without recording the vibrations of said relay as and for the purpose specified.

In testimony whereof, I have hereunto set my hand this 27th day of October, 1913.

WILLIAM M. BRUCE, Jr.

Witnesses:
    CHAS. I. WELCH,
    ESTHER E. PFEIFER.

Copies of this patent may be obtained for five cents each, by addressing the "Commissioner of Patents, Washington, D. C."